US012763646B2

(12) United States Patent
Narita et al.

(10) Patent No.: US 12,763,646 B2
(45) Date of Patent: Oct. 13, 2026

(54) TEMPERATURE SENSOR HOLDER AND TEMPERATURE SENSOR MOUNTING METHOD

(71) Applicant: HONDA MOTOR CO., LTD., Tokyo (JP)

(72) Inventors: Yuji Narita, Wako (JP); Takamori Shirasuna, Wako (JP); Eisuke Kajihara, Wako (JP); Naotada Matsudaira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 18/849,335

(22) PCT Filed: Dec. 19, 2022

(86) PCT No.: PCT/JP2022/046744
§ 371 (c)(1),
(2) Date: Sep. 20, 2024

(87) PCT Pub. No.: WO2023/188600
PCT Pub. Date: Oct. 5, 2023

(65) Prior Publication Data

US 2025/0226730 A1 Jul. 10, 2025

(30) Foreign Application Priority Data

Mar. 29, 2022 (JP) ................................ 2022-054249

(51) Int. Cl.
*H02K 11/25* (2016.01)
*G01K 1/14* (2021.01)
(Continued)

(52) U.S. Cl.
CPC ............... *H02K 11/25* (2016.01); *G01K 1/14* (2013.01); *B62J 45/41* (2020.02); *B62M 7/12* (2013.01)

(58) Field of Classification Search
CPC .. B62J 45/41; B62M 7/12; G01K 1/14; H02K 11/25
(Continued)

(56) References Cited

U.S. PATENT DOCUMENTS

2014/0184031 A1 7/2014 Kaneshige
2015/0155760 A1* 6/2015 Bessho ................. H02K 11/25 310/68 C (Continued)

FOREIGN PATENT DOCUMENTS

CN 203522446 U 4/2014
CN 104113165 A 10/2014

(Continued)

OTHER PUBLICATIONS

International Search Report (PCT/ISA/210) issued in PCT/JP2022/046744, dated Mar. 7, 2023.

*Primary Examiner* — Rashad H Johnson
(74) *Attorney, Agent, or Firm* — Birch, Stewart, Kolasch & Birch, LLP

(57) ABSTRACT

A temperature sensor holder with which it is possible to easily mount a temperature sensor without giving damage on an object to which the temperature sensor is mounted, etc., includes a sensor holding portion that holds the temperature sensor; a holder engagement portion that is to be engaged with an object; and an arm having a curved portion that connects the sensor holding portion and the holder engagement portion. A temperature sensor mounting method for easily mounting the temperature sensor to a motor without giving damage on the motor includes engaging the holder engagement portion with an insulator due to elastic force of (Continued)

the curved portion of the arm of the temperature sensor holder, and at the same time, bringing the temperature sensor into pressure contact with a stator coil by the sensor holding portion to mount the temperature sensor holder to the insulator.

20 Claims, 9 Drawing Sheets

(51) Int. Cl.
*B62J 45/41* (2020.01)
*B62M 7/12* (2006.01)

(58) Field of Classification Search
USPC .......................................... 310/68 B, 68 C, 71
See application file for complete search history.

(56) References Cited

U.S. PATENT DOCUMENTS

| | | | | |
|---|---|---|---|---|
| 2016/0013697 | A1* | 1/2016 | Haga | H02K 5/08 310/71 |
| 2018/0156669 | A1 | 6/2018 | Koyama et al. | |
| 2020/0014272 | A1* | 1/2020 | Asahi | H02K 3/50 |
| 2020/0393306 | A1 | 12/2020 | Yoshihara et al. | |
| 2021/0135531 | A1* | 5/2021 | Iga | H02K 3/28 |
| 2023/0078039 | A1* | 3/2023 | Iwase | H02K 1/187 310/180 |
| 2023/0198342 | A1* | 6/2023 | Ichioka | B25F 5/00 310/68 B |
| 2024/0258852 | A1* | 8/2024 | Niwa | H02K 3/522 |
| 2024/0258856 | A1* | 8/2024 | Niwa | H02K 1/2798 |
| 2024/0258860 | A1* | 8/2024 | Niwa | H02K 21/24 |
| 2024/0258864 | A1* | 8/2024 | Niwa | H02K 3/522 |
| 2024/0258865 | A1* | 8/2024 | Niwa | H02K 3/522 |
| 2024/0258867 | A1* | 8/2024 | Niwa | H02K 1/2798 |
| 2024/0258884 | A1* | 8/2024 | Niwa | H02K 5/18 |
| 2024/0258885 | A1* | 8/2024 | Niwa | H02K 3/522 |
| 2025/0226730 | A1* | 7/2025 | Narita | G01K 1/143 |
| 2026/0135417 | A1* | 5/2026 | Nagai | H02K 1/12 |
| 2026/0149333 | A1* | 5/2026 | Waikar | H02K 7/20 |
| 2026/0149336 | A1* | 5/2026 | Nagai | H02K 11/25 |

FOREIGN PATENT DOCUMENTS

| | | | |
|---|---|---|---|
| JP | 2012-217303 | A | 11/2012 |
| JP | 2013-51806 | A | 3/2013 |
| JP | 2015-106955 | A | 6/2015 |
| JP | 6484334 | B2 | 3/2019 |
| JP | 6674070 | B1 | 4/2020 |

* cited by examiner

TEMPERATURE SENSOR HOLDER AND TEMPERATURE SENSOR MOUNTING METHOD

TECHNICAL FIELD

The present invention relates to a temperature sensor holder for holding a temperature sensor and a temperature sensor mounting method for mounting a temperature sensor using the temperature sensor holder.

BACKGROUND ART

Patent Document 1 discloses a structure in which a temperature sensor that detects the temperature of a stator coil is mounted on a motor using a temperature sensor holder.

PRIOR ART DOCUMENT

Patent Document

Patent Document 1: JP 6484334

The temperature sensor holder disclosed in Patent Document 1 includes a holder fixing portion and a sensor holding portion integrally formed with the holder fixing portion, the holder fixing portion being provided with two tabs that hold a flange of an insulator, the sensor holding portion being provided with a storage groove that stores a temperature sensor and a sensor pressing portion having a cantilever structure in the storage groove.

The temperature sensor holder is mounted on the insulator in such a manner that two tabs are engaged with the flange of the insulator protruding in a direction of a rotation shaft of a rotor from the direction of the rotation shaft of the rotor (a rotary drive shaft of a motor) to hold the flange between the two tabs.

In this state, the temperature sensor stored in the storage groove is held in such a manner that a temperature measuring unit is pressed against a stator coil by a spring force of the sensor pressing portion acting in the direction of the rotation shaft of the rotor.

The protruding flange of the insulator has, on its leading end, a taper and a step located below the taper. The tab of the holder fixing portion engaged with the flange is caught on the step and is less likely to be disengaged.

SUMMARY OF THE INVENTION

Underlying Problem to be Solved by the Invention

Therefore, when the temperature sensor holder is removed, it is necessary to bend the flange to displace the step of the flange in order to disengage the tab of the holder fixing portion of the temperature sensor holder from the step at the leading end of the flange of the insulator. The flange of the insulator protruding in the direction of the rotation shaft of the rotor is a short protrusion, and receives a stress on a base end thereof when being bent. Thus, the flange may be damaged.

During maintenance, only the temperature sensor may be replaced. In that case, when the flange of the insulator is damaged during removal of the temperature sensor holder, the entire motor needs to be replaced, which is inefficient.

The present invention has been made in view of such circumstances, and an object of the present invention is to provide a temperature sensor holder and a temperature sensor mounting method with which it is possible to easily mount a temperature sensor without damaging an object to which the temperature sensor is mounted, etc.

Means to Solve the Problem

In order to achieve the above object, a first aspect of the present invention provides a temperature sensor holder for mounting a temperature sensor that measures a temperature of a measured portion to an object including the measured portion, the temperature sensor holder including:

a sensor holding portion that holds the temperature sensor;

a holder engagement portion that is to be engaged with the object; and an arm having a curved portion connecting the sensor holding portion and the holder engagement portion.

With this configuration, the temperature sensor holder can be mounted on the object in such a manner that the holder engagement portion is engaged with the object due to elastic force of the curved portion of the arm, and at the same time, the sensor holding portion brings the temperature sensor in pressure contact with the measured portion, whereby the temperature sensor can be brought into pressure contact with the measured portion. Thus, the temperature of the measured portion can be accurately measured.

The holder engagement portion can be disengaged from the object by elastically deforming the curved shape of the curved portion of the arm. Thus, the temperature sensor holder can be easily removed from the object.

The curved shape of the curved portion of the arm is deformed to mount and remove the temperature sensor holder, and thus, stress is distributed without concentration. Therefore, the temperature sensor holder is not damaged, and further, the object is not damaged.

A second aspect of the present invention provides a temperature sensor mounting method for mounting a temperature sensor using the temperature sensor holder to a motor including: a stator that includes a stator coil wound around a stator core via an insulator; and a rotor that holds a magnet and that is supported within the stator together with a rotary drive shaft in a rotatable manner, the stator being formed in an annular shape by arranging a plurality of the stator coils in a circumferential direction, the temperature sensor detecting a temperature of the stator coil, the temperature sensor mounting method including engaging the holder engagement portion with the insulator by an elastic force of the curved portion of the arm of the temperature sensor holder, and at the same time, bringing the temperature sensor into pressure contact with the stator coil by the sensor holding portion to mount the temperature sensor holder to the insulator.

With this configuration, the temperature sensor holder can be mounted on the insulator of the motor in such a manner that the holder engagement portion is engaged with the insulator due to elastic force of the curved portion of the arm, and at the same time, the sensor holding portion brings the temperature sensor in pressure contact with the stator coil. Therefore, the load on the temperature sensor due to vibration can be absorbed by the elastic deformation of the curved portion of the arm, whereby the pressure contact of the temperature sensor with the stator coil by the sensor holding portion can be constantly maintained, whereby the temperature of the stator coil can be constantly and stably measured.

The holder engagement portion can be disengaged from the insulator by elastically deforming the curved shape of the curved portion of the arm. Thus, the temperature sensor holder can be easily removed from the insulator.

The curved shape of the curved portion of the arm is deformed to mount and remove the temperature sensor holder, and thus, stress is distributed without concentration. Therefore, the temperature sensor holder is not damaged.

In addition, the insulator of the motor is not deformed and is not damaged.

In a preferred embodiment of the present invention, the holder engagement portion includes an engagement tab that protrudes, and the engagement tab is engaged with an end of the insulator.

With this configuration, the protruding engagement tab of the holder engagement portion is engaged with the end of the insulator. That is, the protruding engagement tab is engaged in a state of being hooked on the end of the insulator, whereby the engagement tab is easily engaged and disengaged. That is, the temperature sensor holder is easily mounted and removed.

In a preferred embodiment of the present invention, the holder engagement portion includes a protruding piece formed closer to the arm relative to the engagement tab, the protruding piece protruding in a direction same as the engagement tab, and the engagement tab is engaged with an end of the insulator positioned between the engagement tab and the protruding piece.

With this configuration, the engagement tab is engaged with the end of the insulator positioned between the engagement tab and the protruding piece protruding in the same direction. Therefore, even when the arm is deformed to open the curved portion by vibration of the motor, the protruding piece comes in contact with the end of the insulator and serves as a stopper, and thus, the end of the insulator is prevented from coming off from between the protruding piece and the engagement tab. Accordingly, the temperature sensor holder is prevented from being disengaged from the insulator.

In a preferred embodiment of the present invention, a pair of the arms extends from the sensor holding portion of the temperature sensor holder in directions opposite to each other, and a pair of the holder engagement portions is provided at outer ends of the pair of arms.

With this configuration, the sensor holding portion at the center presses the temperature sensor against the stator coil by the elastic force of the curved portions of the arms on both sides of the sensor holding portion, so that the temperature sensor can be stably pressed against the stator coil in a well-balanced manner.

In addition, when the temperature sensor holder is removed from the insulator, the curved portions of the arms on both sides are elastically deformed. Therefore, only small deformation of the curved portions of the arms is required, and thus, the temperature sensor holder is not damaged.

In a preferred embodiment of the present invention, the engagement tab of at least one of the pair of holder engagement portions has an inclined surface tapered toward a leading end in a direction perpendicular to a protruding direction of the engagement tab.

With this configuration, the engagement tab of at least one of the pair of holder engagement portions has the inclined surface tapered toward the leading end in the direction perpendicular to the protruding direction thereof. Therefore, when the inclined surface of the engagement tab is pressed against the end of the insulator, the curved portion of the arm is elastically deformed, the position of the engagement tab is changed while the end of the insulator slides on the inclined surface of the engagement tab, and the engagement tab can be engaged with the end of the insulator by the elastic restoring force of the curved portion of the arm after the engagement tab climbs over the end face of the insulator.

Therefore, the temperature sensor holder can be smoothly mounted on the insulator.

In a preferred embodiment of the present invention, the insulator has a flange formed along the stator coil at an opening end of a cylindrical portion on a radially outer side of the stator, the cylindrical portion being located between the stator core and the stator coil, and the temperature sensor holder is mounted on the flange from a radially outer side of the stator with the holder engagement portion being engaged with an end of the flange.

With this configuration, the temperature sensor holder can be mounted on the flange of the insulator formed on the outside of the stator in the radial direction from the radially outer side of the stator with the holder engagement portion being engaged with the end of the flange, whereby the temperature sensor holder does not interfere with the insertion of the rotor within the stator.

In addition, it is possible to prevent the temperature sensor holder from protruding from the stator coil in the axial direction.

In a preferred embodiment of the present invention, the flange of the insulator is formed with a positioning protrusion that protrudes outward in the radial direction of the stator and restricts movement of the temperature sensor holder in the axial direction of the rotary drive shaft.

With this configuration, the flange of the insulator is provided with the positioning protrusion that protrudes radially outward of the stator and restricts the movement of the temperature sensor holder in the axial direction of the rotary drive shaft, so that the temperature sensor holder can be prevented from being disengaged even when the motor receives impact or vibration in the axial direction of the rotary drive shaft.

In a preferred embodiment of the present invention, the flange of the insulator has an opening through which the stator coil is exposed, and when the temperature sensor holder is mounted on the flange, the temperature sensor held by the sensor holding portion enters the opening and is brought into pressure contact with the stator coil.

With this configuration, when the opening through which the stator coil is exposed is formed in the flange of the insulator and the temperature sensor holder is mounted on the flange, the temperature sensor held by the sensor holding portion enters the opening and is brought into pressure contact with the stator coil, so that a simple and compact temperature sensor mounting structure can be obtained.

In a preferred embodiment of the present invention, the curved portion of the arm of the temperature sensor holder is curved so as to project outward in the radial direction of the stator, and the temperature sensor held by the sensor holding portion is brought into pressure contact with the stator coil by an elastic force of the curved portion of the arm toward inside of the stator in the radial direction.

With this configuration, the curved portion of the arm of the temperature sensor holder is curved so as to project outward in the radial direction of the stator, and the temperature sensor held by the sensor holding portion is brought into pressure contact with the stator coil by the elastic force of the curved portion of the arm toward the inside of the stator in the radial direction. Therefore, even when the motor receives vibration of the stator in the radial direction, the temperature sensor can be constantly brought into pressure contact with the stator coil following the vibration by the elastic deformation of the curved portion of the arm that is curved so as to project outward in the radial direction of the stator.

In a preferred embodiment of the present invention, the motor is mounted on a vehicle with the rotary drive shaft being oriented in a horizontal direction.

With this configuration, the motor is mounted on the vehicle with the rotary drive shaft being oriented in the horizontal direction. Therefore, the vibration in the vertical direction accompanying the traveling of the vehicle is the vibration of the stator of the motor in the radial direction, and thus, the elastic deformation of the curved portion projecting in the radial direction of the arm effectively acts, so that the temperature sensor can be constantly pressed against the stator coil following the vibration in the vertical direction.

Advantageous Effects of the Invention

With the first aspect of the present invention, the temperature sensor holder can be mounted on the object in such a manner that the holder engagement portion is engaged with the object due to elastic force of the curved portion of the arm, and at the same time, the sensor holding portion brings the temperature sensor in pressure contact with the measured portion, whereby the temperature sensor can be brought into pressure contact with the measured portion. Thus, the temperature of the measured portion can be accurately measured.

The holder engagement portion can be disengaged from the object by elastically deforming the curved shape of the curved portion of the arm. Thus, the temperature sensor holder can be easily removed from the object.

The curved shape of the curved portion of the arm is deformed to mount and remove the temperature sensor holder, and thus, stress is distributed without concentration. Therefore, the temperature sensor holder is not damaged, and further, the object is not damaged.

With the second aspect of the present invention, the temperature sensor holder can be mounted on the insulator of the motor in such a manner that the holder engagement portion is engaged with the insulator due to elastic force of the curved portion of the arm, and at the same time, the sensor holding portion brings the temperature sensor in pressure contact with the stator coil. Therefore, the load on the temperature sensor due to vibration can be absorbed by the elastic deformation of the curved portion of the arm, whereby the pressure contact of the temperature sensor with the stator coil by the sensor holding portion can be constantly maintained, whereby the temperature of the stator coil can be constantly and stably measured.

The holder engagement portion can be disengaged from the insulator by elastically deforming the curved shape of the curved portion of the arm. Thus, the temperature sensor holder can be easily removed from the insulator.

The curved shape of the curved portion of the arm is deformed to mount and remove the temperature sensor holder, and thus, stress is distributed without concentration. Therefore, the temperature sensor holder is not damaged.

In addition, the insulator of the motor is not deformed and is not damaged.

MODES FOR CARRYING OUT THE INVENTION

Hereinafter, an embodiment according to the present invention will be described with reference to FIGS. 1 to 9.

Figure 1:
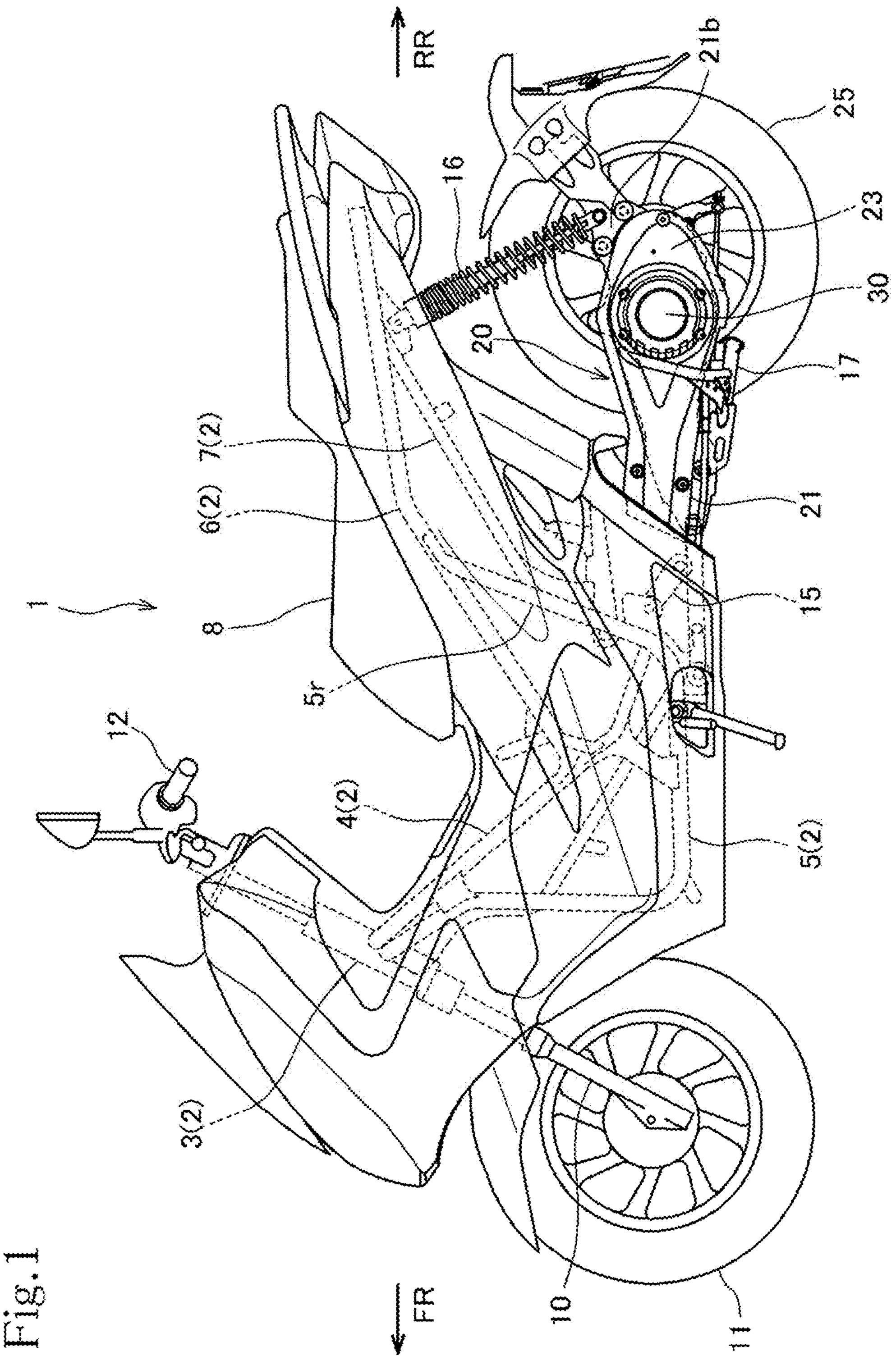
FIG. 1 is a left side view of a motorcycle according to an embodiment of the present invention.
Figure 2:
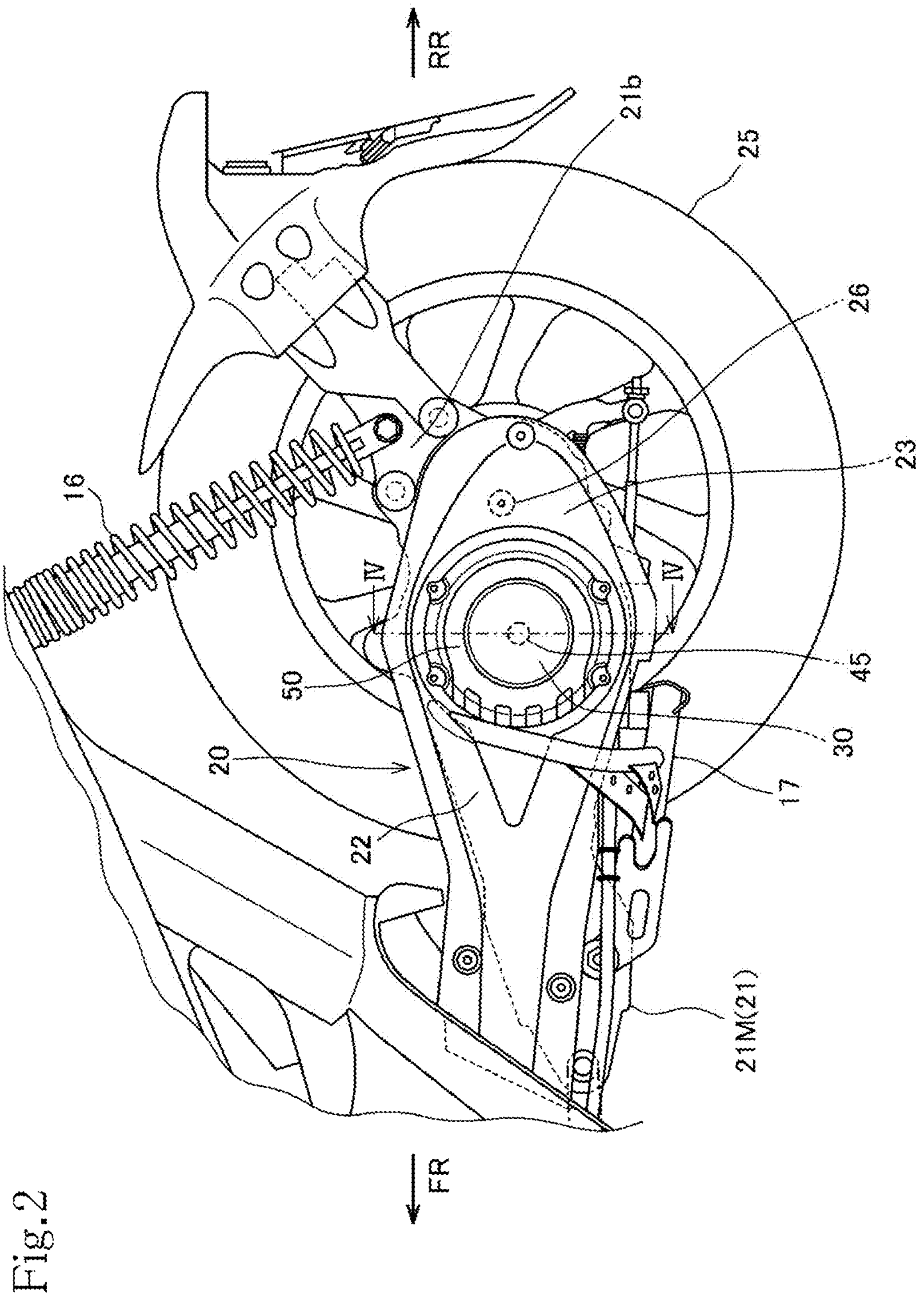
FIG. 2 is a left side view of a rear part of the motorcycle.

FIG. 1 is a left side view of a motorcycle 1 that is a straddled vehicle according to an embodiment to which the present invention is applied.

In the description of the present specification, the front, rear, left, and right directions follow a normal standard in which a straight traveling direction of the motorcycle 1 according to the present embodiment is a forward direction, and in the drawings, an arrow FR indicates a forward direction, an arrow RR indicates a rearward direction, an arrow LH indicates a leftward direction, and an arrow RH indicates a rightward direction.

The motorcycle 1 is a unit swing type motorcycle.

In FIG. 1, a vehicle body frame 2 of the motorcycle 1 includes a head pipe 3 rotatably supporting a front fork 10, a main frame 4 extending rearward and downward from the head pipe 3, a pair of left and right down frames 5 each of which extends downward from a lower part of the head pipe 3, is bent at a lower end to extend rearward, and then extends rearward and upward in an oblique manner, and a pair of left and right seat rails 6 each of which extends rearward and upward in an oblique manner from a middle part of the main frame 4. The rear end of the main frame 4 is connected to lower parts of rear portions **5*r* extending rearward and upward in an oblique manner of the down frames 5, and the upper ends of the rear portions 5*r* are connected to the seat rails 6**.

A back stay 7 connects the rear portions **5*r* of the down frames 5 and the seat rails 6 to each other to support the seat rails 6**.

A seat 8 is supported by the seat rails 6.

A front wheel 11 is rotatably supported at a lower end of the front fork 10 supported by the head pipe 3, and a steering handlebar 12 is mounted at an upper end of a pivot of the front fork 10.

A front end of a swing frame 21, which is a supporting body of a power unit 20, is connected to the lower parts of the rear portions **5*r* of the down frames 5 via a link mechanism 15, and the power unit 20 can swing up and down integrally with the swing frame 21**.

A rear wheel 25 is pivotally supported at a rear end of the swing frame 21.

A rear cushion 16 is interposed between a bracket 21*b* protruding rearward of the swing frame 21 and the seat rails 6.

The swing frame 21 includes a main arm 21M extending from the front of the rear wheel 25 to the left side of the rear wheel 25, and a sub arm (not illustrated) extending from a front right side of the main arm 21M to the right side of the rear wheel 25.

A stand 17 is mounted at a lower part of the swing frame 21 so as to be retractable.

The power unit 20 is configured in such a manner that the motor 30 is mounted on the left side of a rear part of the main arm 21M, a power transmission mechanism 23 is mounted on the right side of the rear part of the main arm 21M, and a rear axle 26 of the rear wheel 25 is pivotally supported at a rear end of the main arm 21M, so that rotation of a rotary drive shaft 45 which is an output shaft of the motor 30 is transmitted to the rear wheel 25 via the power transmission mechanism 23.

Figure 3:
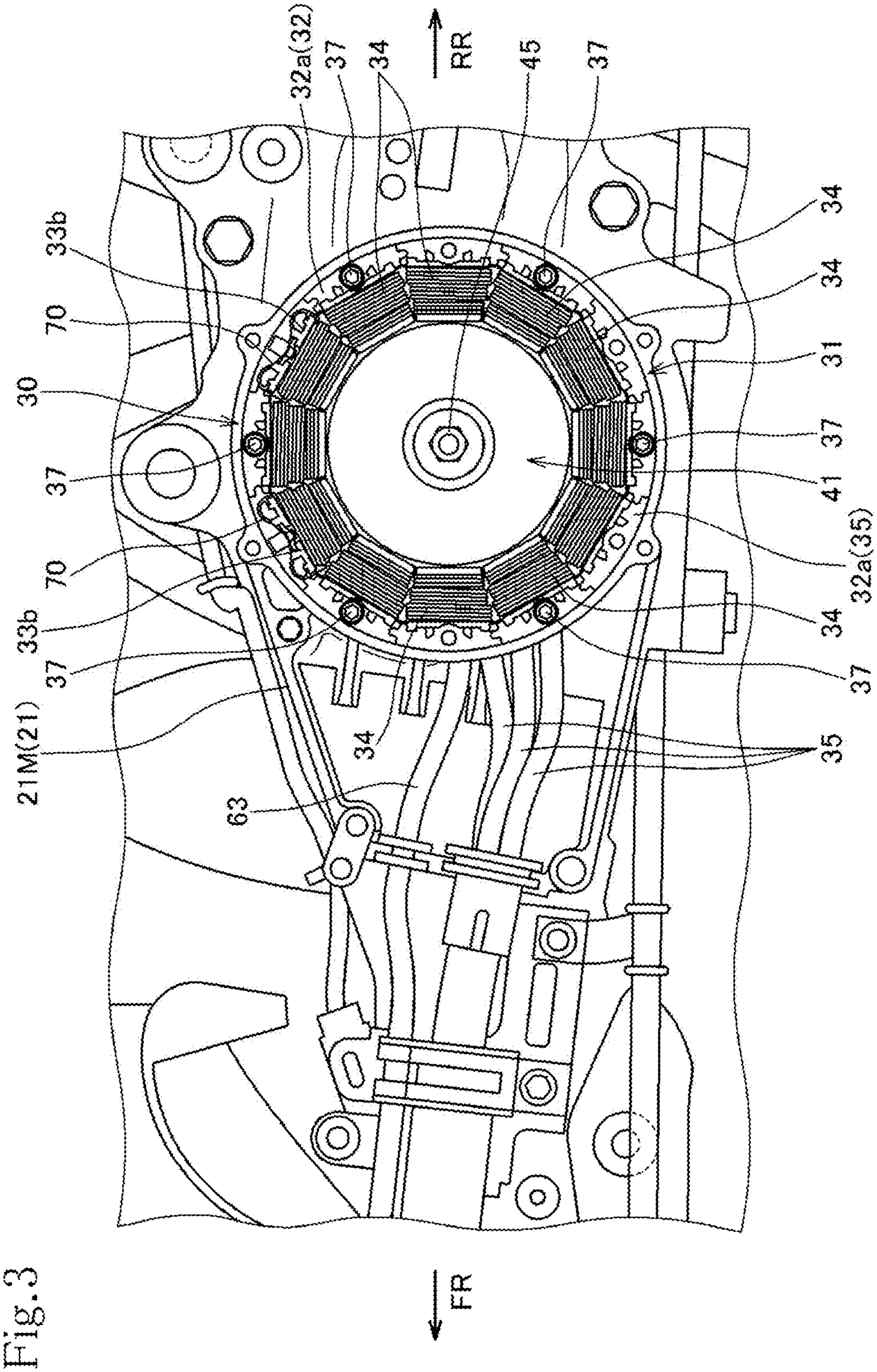
FIG. 3 is a left side view of the motorcycle from which an arm cover of a swing frame and a motor cover are removed.

As illustrated in FIG. 3, the motor 30 is disposed in a rear part of a left opening of the main arm 21M that is elongated in a front-rear direction with the rotary drive shaft 45 of the motor 30 being oriented in a vehicle width direction.

The motor 30 is covered with a bottomed cylindrical motor cover 50 from an outer side (left side) in an axial direction of the rotary drive shaft 45 which is a motor output shaft.

The left opening of the main arm 21M which is elongated in the front-rear direction is covered with an arm cover 22 except for the motor cover 50.

Figure 4:
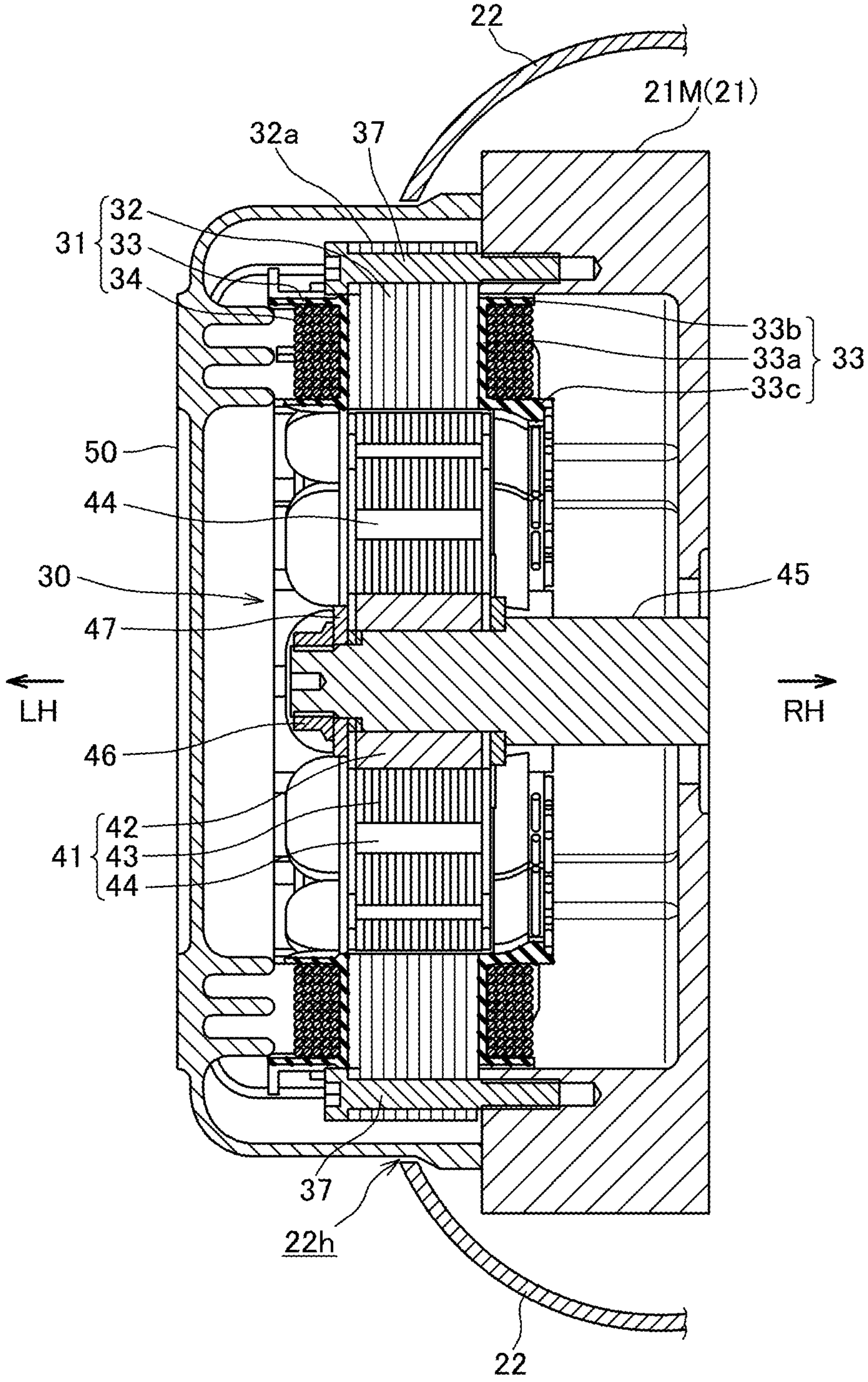
FIG. 4 is a cross-sectional view of a motor mounted on the motorcycle taken along line IV-IV in FIG. 2.

The arm cover 22 has an opening 22*h* formed in a portion corresponding to the bottomed cylindrical motor cover 50, and the motor cover 50 protrudes leftward from the opening 22*h* when the arm cover 22 is placed in the left opening of the main arm 21M (see FIG. 4).

Figure 5:
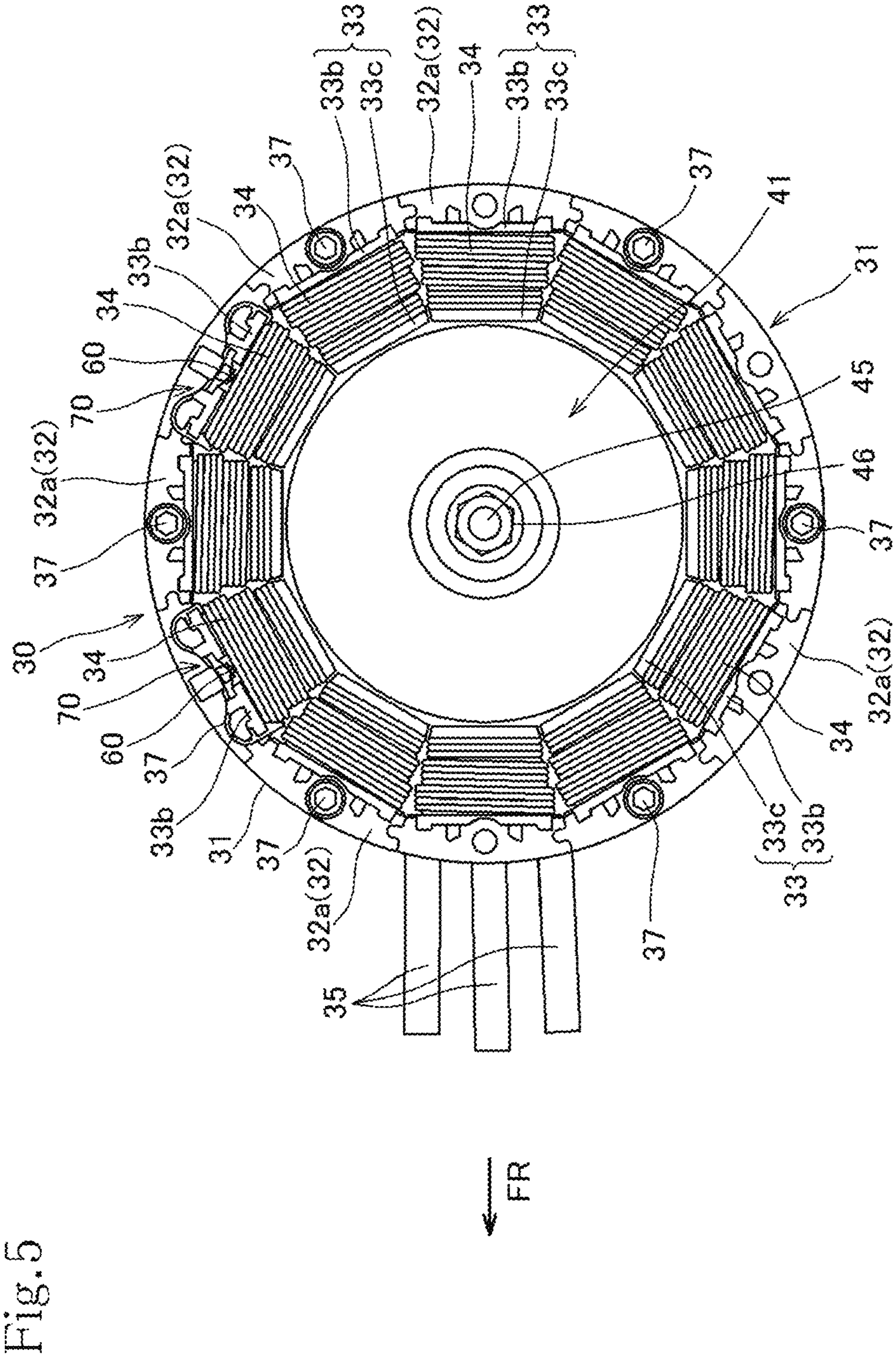
FIG. 5 is a left side view of the motor.

Referring to FIGS. 3 to 5, the motor 30 is an inner rotor AC electric motor.

A rotor 41 is inserted inside a stator 31 formed in an annular shape.

The stator 31 is of a split core type, and a stator coil 34 is wound around each of a plurality of stator cores 32 which is divided and arranged radially in a circumferential direction via a bobbin-shaped insulator 33 which is a resin insulator.

Therefore, the stator 31 is formed in an annular shape by arranging, in the circumferential direction, a plurality of stator coils 34 respectively wound around the stator cores 32 that are radially arranged.

Each of the stator cores 32 has an outer arc-shaped end part 32*a* protruding outward from the insulator 33 in a radial direction to form an arc shape, and the outer arc-shaped end parts 32*a* of the adjacent stator cores 32 are coupled to each other to form an annular shape as a whole.

As illustrated in FIG. 4, the stator 31 is fixed to the main arm 21M by fastening the outer arc-shaped end parts 32*a* of the stator cores 32 to the main arm 21M with bolts 37.

The outer arc-shaped end parts 32*a* of the stator cores 32 formed in an annular shape are fastened to the main arm 21M by the bolts 37 at six locations in the circumferential direction (see FIG. 3).

The rotor 41 is provided inside and at the center of the stator 31, which is annularly formed, with the rotary drive shaft 45 as a central axis.

Referring to FIG. 4, the rotor 41 includes an annular rotor core 43 that is fitted to an end of the rotary drive shaft 45 via a cylindrical boss portion 42, and magnets 44 that are fitted in the rotor core 43 at intervals in the circumferential direction.

The rotary drive shaft 45 is pivotally supported by the main arm 21M in a rotatable manner while being oriented in the horizontal vehicle width direction, and serves as an input shaft of the power transmission mechanism 23 mounted on the right side of the main arm 21M, and the rotor 41 is fitted and fixed to a protruding portion of the rotary drive shaft 45 on the left side of the main arm 21M.

Referring to FIG. 4, a male thread is formed at a left end of the rotary drive shaft 45, and the cylindrical boss portion 42 of the fitted rotor 41 is tightened by a nut 46 screwed onto the male thread via a washer 47 to integrally fasten the rotor 41 to the rotary drive shaft 45.

Therefore, the rotor 41 integrally rotates with the rotary drive shaft 45 by driving the motor 30, and the rotation of the rotary drive shaft 45 is transmitted to the rear axle 26 via the power transmission mechanism 23 to rotate the rear wheel 25. Thus, the motorcycle 1 travels.

The motor 30 is a three-phase AC electric motor, and as illustrated in FIG. 3, three three-phase electric wires 35 extend forward from the stator coils 34 of the stator 31 along the surface of the left opening of the main arm 21M.

Although not illustrated, an inverter converts DC power from a battery into three-phase AC power, and the three-phase AC power is supplied to the stator coils 34 of the motor 30 by the three-phase electric wires 35 to drive the motor 30.

The insulator 33 made of a resin material in the stator 31 of the motor 30 having the above-described structure has a bobbin shape. Referring to FIG. 4, the insulator 33 includes a cylindrical portion 33*a* located between the stator core 32 and the stator coil 34 and flanges 33*b* and 33*c* formed at ends of both openings of the cylindrical portion 33*a*, respectively.

The flanges 33*b* and 33*c* are formed in a rectangular shape with the opening ends of the cylindrical portion 33*a* extending outward in the circumferential direction.

As illustrated in FIGS. 4 and 5, the outer flange 33*b* is formed at the end of the opening of the cylindrical portion 33*a* located outside in the radial direction, the cylindrical portion 33*a* being oriented in the radial direction of (radially oriented with respect to) the stator 31, and the inner flange 33*c* is formed at the end of the opening of the cylindrical portion 33*a* located inside in the radial direction.

The outer flange 33*b* of the insulator 33 is in contact with a radially outer end of the stator coil 34 wound around the cylindrical portion 33*a*, and the inner flange 33*c* of the insulator 33 is in contact with a radially inner end face of the stator coil 34 wound around the cylindrical portion 33*a*.

The temperature sensor holder 70 that holds the temperature sensor 60 for detecting a temperature of the stator coil 34 is mounted on the outer flanges 33*b* of the insulators 33 of two stator cores 32 which are the front-side stator core 32 and the rear-side stator core 32 out of the upper stator cores among the plurality of stator cores 32 arranged radially in the circumferential direction (see FIGS. 3 and 5).

The temperature sensor 60 has a sensor element incorporated in a cylindrical sensor tube 61, and has a temperature measuring unit 62 at one end of the sensor tube 61.

The temperature sensor 60 is illustrated with a dotted pattern in FIGS. 6 to 9.

Figure 7:
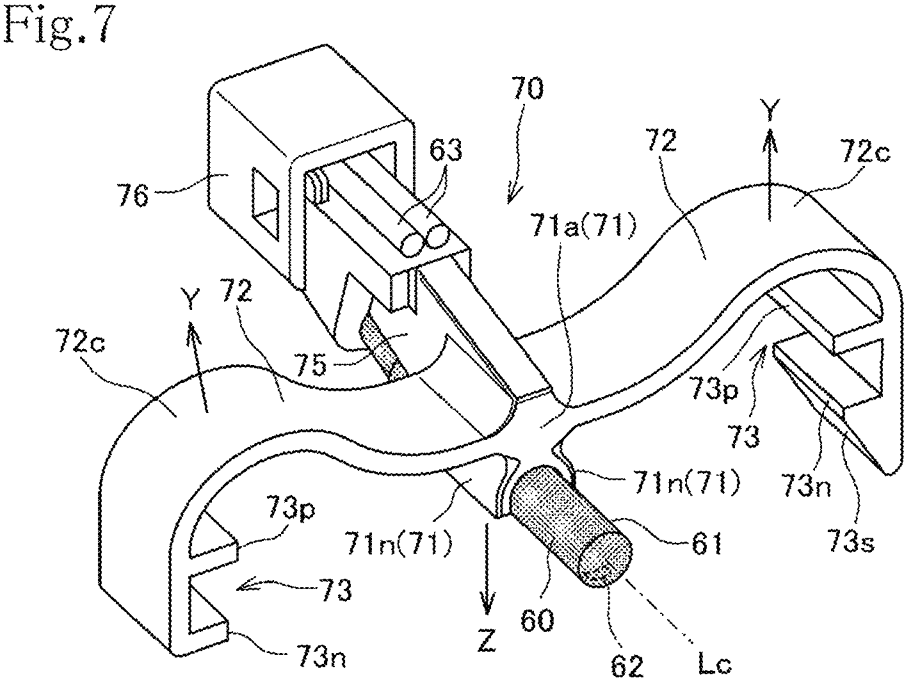
FIG. 7 is a perspective view of a temperature sensor holder holding a temperature sensor.

Referring to FIG. 7, the temperature sensor holder 70 is made of resin, and includes a sensor holding portion 71 that holds the temperature sensor 60, a pair of arms 72 and 72 having curved portions 72*c* and 72*c* extending in opposite directions from the sensor holding portion 71, and a pair of holder engagement portions 73 and 73 respectively provided at outer ends of the pair of arms 72 and 72 facing each other.

The sensor holding portion 71 has a pair of holder tabs 71*n* and 71*n* that forms a cylindrical shape with one side in the circumferential direction being open and that symmetrically protrudes from a central base part 71*a* so as to face each other.

The temperature sensor 60 is held in such a manner that the cylindrical sensor tube 61 of the temperature sensor 60 is held by the pair of holder tabs 71*n* and 71*n* from both sides with a central axis of the sensor tube 61 being aligned with a central axis Lc of a cylinder defined by the pair of cylindrical holder tabs 71*n* and 71*n*.

Figure 9:
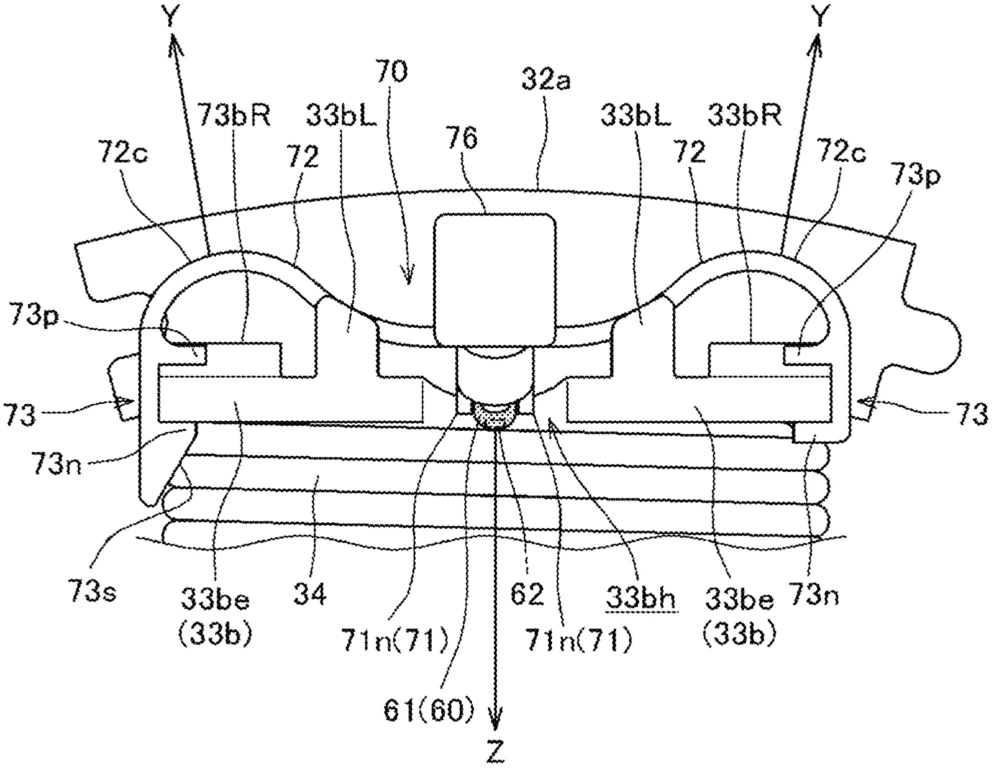
FIG. 9 is a left side view of the temperature sensor holder mounted on the flange of the insulator.

When the pair of holder tabs 71*n* and 71*n* holds the sensor tube 61, the cylindrical sensor tube 61 partially protrudes from between tips of both of the pair of holder tabs 71*n* and 71*n* (see FIG. 9).

As illustrated in FIG. 7, the pair of arms 72 and 72 extends in opposite directions from the central base part 71*a* at the proximal ends of the pair of holder tabs 71*n* and 71*n*.

The temperature sensor holder 70 includes a connection portion 75 that extends in the axial direction of the central axis Lc from the central base part 71*a* of the sensor holding portion 71 and a box portion 76 provided via the connection portion 75.

As illustrated in FIG. 7, the sensor tube 61 extends to both sides in the axial direction of the central axis Lc from the portion held by the pair of holder tabs 71*n* and 71*n*. An end of a portion of the sensor tube 61 extending along the connection portion 75 on the connection portion 75 side is inserted into the box portion 76, and an end of a portion extending to the side opposite to the connection portion 75 is provided with the temperature measuring unit 62.

Two signal lines 63 of the temperature sensor 60 extend from the end of the sensor tube 61 inserted into the box portion 76 and extend from the inside of the box portion 76 toward the connection portion 75.

The pair of arms 72 and 72 extending in the opposite directions from the central base part 71*a* of the sensor holding portion 71 are band-shaped plate portions having a constant width in the axial direction of the central axis Lc, and have: curved portions 72*c* and 72*c* curved so as to project in a direction (direction indicated by an arrow Y in FIGS. 7 and 9) substantially opposite to the direction (direction indicated by an arrow Z in FIGS. 7 and 9) in which the holder tabs 71*n* and 71*n* protrude from the central base part 71*a*; and the pair of holder engagement portions 73 and 73 at outer ends of the curved portions 72*c* and 72*c* facing each other.

The pair of holder engagement portions 73 and 73 facing each other has a pair of engagement tabs 73*n* and 73*n* that protrudes in a direction in which the holder engagement tabs 73*n* and 73*n* face each other.

The engagement tab 73*n* of one of the pair of holder engagement portions 73 and 73 has an inclined surface 73*s* that tapers toward the leading end in a direction perpendicular to the direction in which the engagement tab 73*n* protrudes.

The pair of holder engagement portions 73 and 73 also has protruding pieces 73*p* and 73*p* protruding in parallel to the engagement tabs 73*n* and 73*n* in the same direction as the engagement tabs 73*n* and 73*n* on the side closer to the arms 72 and 72 with respect to the engagement tabs 73*n* and 73*n*.

Figure 6:
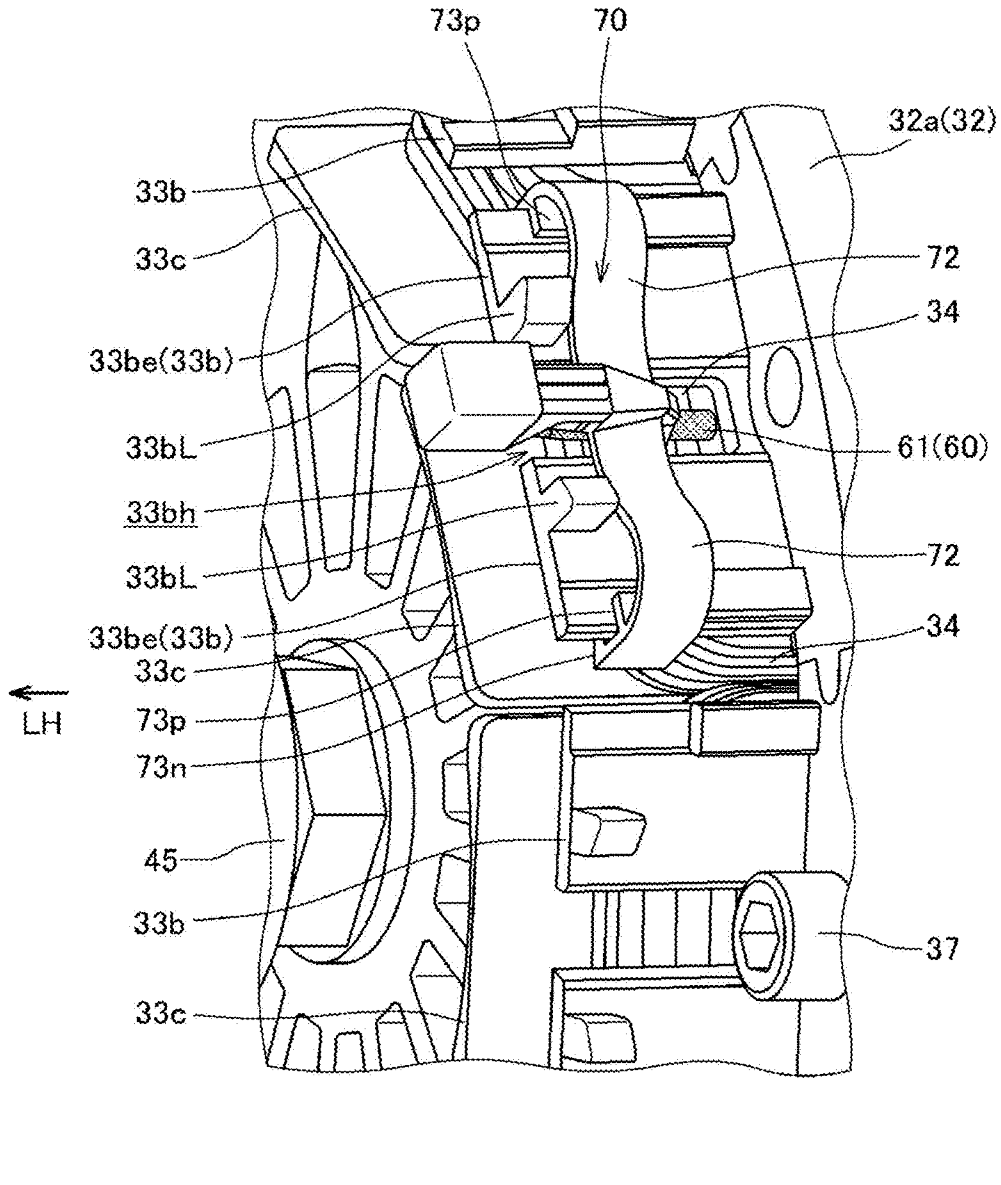
FIG. 6 is a partial perspective view of the motor.

The temperature sensor holder 70 is mounted on a left end part 33*be* of the outer flange 33*b*, which has a rectangular plate shape, of the insulator 33 as illustrated in FIG. 6.

The left end part 33*be* of the outer flange 33*b* in contact with the radially outer end of the stator coil 34 wound around the cylindrical portion 33*a* of the insulator 33 protrudes to the left beyond the radially outer end of the stator coil 34, and the temperature sensor holder 70 is mounted on the protruding left end part 33*be*.

Figure 8:
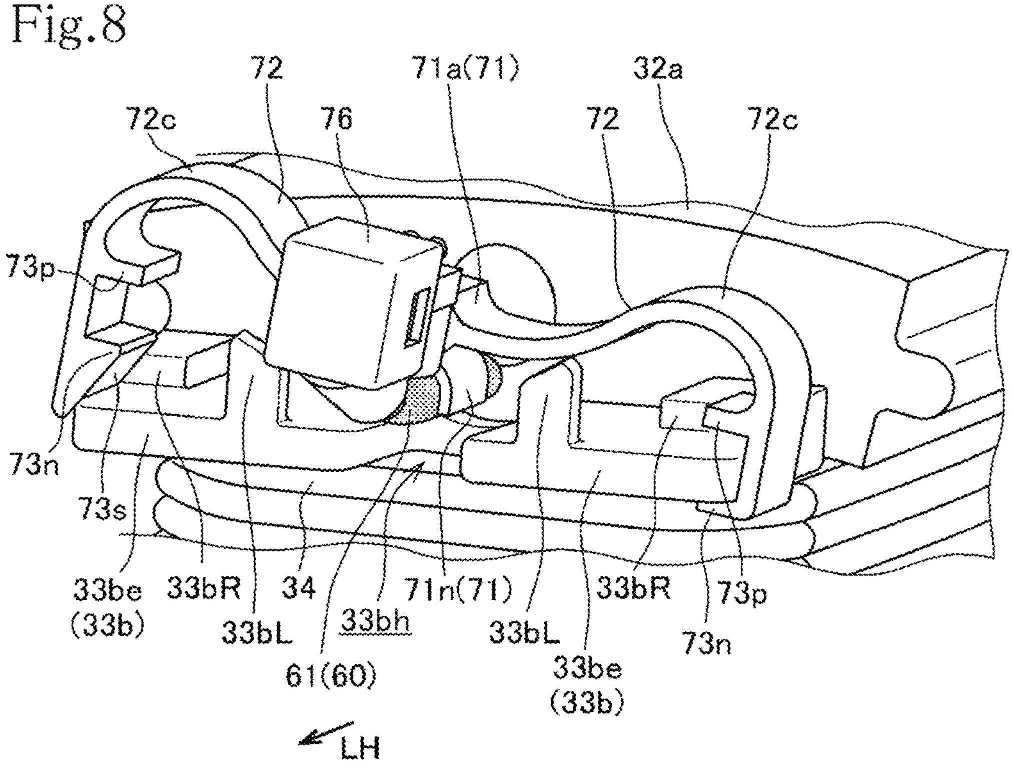
FIG. 8 is a perspective view illustrating a state in which the temperature sensor holder is being mounted on a flange of an insulator.

As illustrated in FIG. 8, the left end part 33*be*, which has a rectangular plate shape, of the outer flange 33*b* is cut from the center of the left edge to the right to form an opening 33*bh*.

The opening 33*bh* extends to the right up to a region where the radially outer end of the stator coil 34 is exposed.

Further, the left end part 33*be* of the outer flange 33*b* includes two left positioning protrusions 33*b*L and two right positioning protrusions 33*b*R which protrude in the radial direction of the stator 31. A set of the left positioning protrusion 33*b*L and the right positioning protrusion 33*b*R is provided on each side of the opening 33*bh*.

As illustrated in FIG. 8, the left positioning protrusion 33*b*L protrudes along the left end edge of the left end part 33*be* at a position close to the opening 33*bh*, and the right positioning protrusion 33*b*R protrudes at a position farther from the opening 33*bh* so as to be away from the left positioning protrusion 33*b*L to the right by the width of the arm 72 of the temperature sensor holder 70.

The left positioning protrusions 33*b*L and 33*b*L are formed at symmetrical positions on both sides of the opening 33*bh*, and the right positioning protrusions 33*b*R and 33*b*R are similarly formed at symmetrical positions on both sides of opening 33*bh*.

The left positioning protrusion 33*b*L and the right positioning protrusion 33*b*R position the temperature sensor holder 70 by holding the arm 72 therebetween.

The temperature sensor holder 70 holding the temperature sensor 60 is mounted on the left end part 33*be* of the outer flange 33*b* of the insulator 33 from the outside of the stator 31 in the radial direction.

Referring to FIG. 8, first, the temperature sensor holder 70 is positioned on the radially outer side of the stator 31 with respect to the left end part 33*be* of the outer flange 33*b*, and one of the engagement tabs 73*n* without having the inclined surface 73*s* out of the pair of engagement tabs 73*n* and 73*n* of the temperature sensor holder 70 is hooked on one side part protruding to the left of the left end part 33*be* of the outer flange 33*b*.

The side part of the left end part 33*be* of the outer flange 33*b* is located between the engagement tab 73*n* and the protruding piece 73*p*.

Next, the temperature sensor holder 70 inclined with respect to the outer flange 33*b* is rotated about the portion where the temperature sensor holder 70 is hooked on the engagement tab 73*n* not having the inclined surface 73*s* in a direction in which the other engagement tab 73*n* having the inclined surface 73*s* approaches the other side part of the left end part 33*be*.

Due to the rotation of the temperature sensor holder 70, the inclined surface 73*s* of the other engagement tab 73*n* comes into contact with and slides on the other side part of the left end part 33*be* of the outer flange 33*b*, and the curved portion 72*c* of the arm 72 is elastically deformed so as to open, whereby the engagement tab 73*n* is displaced in a direction away from the other side part of the left end part 33*be* of the outer flange 33*b*.

While the inclined surface 73*s* of the other engagement tab 73*n* is in sliding contact with the other side part of the left end part 33*be* of the outer flange 33*b* due to the rotation of the temperature sensor holder 70, the temperature sensor

60 held by the pair of holder tabs 71*n* and 71*n* of the sensor holding portion 71 at the center of the temperature sensor holder 70 enters the opening 73*bh* of the left end part 33*be* of the outer flange 33*b* and is brought into pressure contact with the stator coil 34 exposed from the opening 73*bh*.

The temperature sensor holder 70 is further rotated after the temperature sensor 60 is brought into pressure contact with the stator coil 34, by which the curved portion 72*c* of the arm 72 is elastically deformed so as to be further opened to allow the other engagement tab 73*n* to climb over the other side part of the left end part 33*be* of the outer flange 33*b*, and an elastic force acts in a direction in which the opened curved portion 72*c* of the arm 72 is closed. Thus, the other engagement tab 73*n* is engaged with the other side part of the left end part 33*be* of the outer flange 33*b* as illustrated in FIG. 9.

Elastic force acts on the pair of arms 72 and 72 in a direction in which the curved portions 72*c* and 72*c* are closed, by which the pair of engagement tabs 73*n* and 73*n* is engaged with the side parts of the left end part 33*be*, and at the same time, the sensor holding portion 71 at the center brings the temperature sensor 60 in pressure contact with the stator coil 34. Thus, the temperature sensor holder 70 is mounted on the left end part 33*be* of the outer flange 33*b* of the insulator 33.

The curved portion 72*c* of the arm 72 of the temperature sensor holder 70 is curved so as to project outward in the radial direction of the stator 31 (the direction indicated by the arrow Y in FIG. 9), and the temperature sensor 60 held by the sensor holding portion 71 is brought into pressure contact with the stator coil 34 by the elastic force of the curved portion 72*c* of the arm 72 toward the inside of the stator 31 in the radial direction (the direction indicated by the arrow Z in FIG. 9).

In the temperature sensor 60, the temperature measuring unit 62 at one end of the sensor tube 61 is in pressure contact with the stator coil 34.

The arms 72 are held between the two left positioning protrusions 33*b*L and the right positioning protrusions 33*b*R protruding in the radial direction of the stator 31 at the left end part 33*be* of the outer flange 33*b*, whereby the movement of the temperature sensor holder 70 in the axial direction (left-right direction) of the rotary drive shaft 45 is restricted.

Note that the left positioning protrusion 33*b*L is located on the proximal end side (the central base part 71*a* side) of the curved portion 72*c* of the arm 72, and the right positioning protrusion 33*b*R is located on the outer end side (the holder engagement portion 73 side) of the curved portion 72*c*. That is, the left positioning protrusion 33*b*L and the right positioning protrusion 33*b*R are provided avoiding the curved portion 72*c* of the arm 72 that is elastically deformed. Thus, even when the curved portion 72*c* of the arm 72 is deformed by vibration, the positioning of the rotary drive shaft 45 in the axial direction is maintained.

As illustrated in FIG. 3, the motor 30 is disposed at the rear part of the main arm 21M of the swing frame 21 with the rotary drive shaft 45 being oriented in the horizontal vehicle width direction.

In the motor 30 oriented as described above, the temperature sensor holders 70 are respectively mounted on the outer flanges 33*b* and 33*b* of the insulators 33 and 33 provided in the front-side stator core 32 and the rear-side stator core 32 out of the uppermost stator cores 32 among the plurality of stator cores 32 divided and arranged in the circumferential direction of the stator 31 (see FIG. 3).

The embodiment of the temperature sensor mounting structure according to the present invention described in detail above has the following effects.

As illustrated in FIG. 9, the temperature sensor holder 70 can be mounted on the outer flange 33*b* of the insulator 33 in such a manner that the engagement tab 73*n* of the holder engagement portion 73 is engaged with the outer flange 33*b* of the insulator 33 due to elastic force of the curved portion 72*c* of the arm 72, and at the same time, the sensor holding portion 71 brings the temperature sensor 60 in pressure contact with the stator coil 34. Therefore, the load on the temperature sensor 60 due to vibration can be absorbed by the elastic deformation of the curved portion 72*c* of the arm 72, whereby the pressure contact of the temperature sensor 60 with the stator coil 34 by the sensor holding portion 71 can be constantly maintained.

Accordingly, the temperature of the stator coil 34 can be constantly and stably measured.

Referring to FIG. 8, the temperature sensor holder 70 mounted on the outer flange 33*b* of the insulator 33 can be removed from the outer flange 33*b* of the insulator 33 in such a manner that the curved shape of the curved portion 72*c* of the arm 72 is deformed to release the engagement of the engagement tab 73*n* of the holder engagement portion 73 with the outer flange 33*b* of the insulator 33. Thus, the temperature sensor holder 70 can be easily removed.

Since the protruding engagement tab 73*n* of the holder engagement portion 73 is engaged with the end of the outer flange 33*b* of the insulator 33, the protruding engagement tab 73*n* is engaged in a state of being hooked on the end of the outer flange 33*b* of the insulator 33. Therefore, the engagement tab 73*n* is easily engaged and disengaged. That is, the temperature sensor holder 70 is more easily mounted and removed.

Since the curved shape of the curved portion 72*c* of the arm 72 is deformed to mount and remove the temperature sensor holder 70, stress is distributed without concentration, so that the temperature sensor holder 70 is not damaged.

In addition, there is no influence on the outer flange 33*b* of the insulator 33, and the insulator 33 is also not deformed and is not damaged.

In the temperature sensor holder 70 according to the present embodiment, the pair of arms 72 extends from the sensor holding portion 71 in directions opposite to each other, and the engagement tabs 73*n* of the pair of holder engagement portions 73 are provided at the outer ends of the pair of arms 72.

Therefore, with reference to FIG. 9, the sensor holding portion 71 at the center brings the temperature sensor 60 in pressure contact with the stator coil 34 by the elastic force of the curved portions 72*c* and 72*c* of the arms 72 and 72 on both sides of the sensor holding portion 71, so that the temperature sensor 60 can be stably brought into pressure contact with the stator coil 34 in a well-balanced manner.

In addition, with reference to FIG. 8, when the temperature sensor holder 70 is removed from the outer flange 33*b* of the insulator 33, the curved portions 72*c* and 72*c* of the arms 72 and 72 on both sides are elastically deformed. Therefore, only small deformation of the curved portions 72*c* of the arms 72 is required, and thus, the temperature sensor holder is not damaged.

As illustrated in FIG. 9, the holder engagement portion 73 has the protruding piece 73*p* protruding in the same direction as the engagement tab 73*n* on the arm 72 side with respect to the engagement tab 73*n*, and the engagement tab 73*n* is engaged with the end of the outer flange 33*b* of the insulator 33 positioned between the engagement tab 73*n* and the protruding piece 73*p*. Therefore, even when the arm 72 is deformed to open the curved portion 72*c* by the vibration of the motor 30, the protruding piece 73*p* comes in contact with the end of the outer flange 33*b* of the insulator 33 and serves as a stopper, and thus, the end of the outer flange 33*b* of the insulator 33 is prevented from coming off from between the protruding piece 73*p* and the engagement tab 73*n*. Accordingly, the temperature sensor holder 70 is prevented from being disengaged from the outer flange 33*b* of the insulator 33.

Further, as illustrated in FIG. 8, when the engagement tab 73*n* not having the inclined surface 73*s* is hooked on one side part of the left end part 33*be* protruding to the left of the outer flange 33*b* during mounting of the temperature sensor holder 70 to the outer flange 33*b* of the insulator 33, the one side part of the left end part 33*be* of the outer flange 33*b* is positioned between the engagement tab 73*n* and the protruding piece 73*p*. Therefore, when the temperature sensor holder 70 is rotated to engage the other engagement tab 73*n* having the inclined surface 73*s* with the other side part of the left end part 33*be* of the outer flange 33*b*, the protruding piece 73*p* serves as a stopper to prevent the engaged engagement tab 73*n* from being disengaged from the one side part of the left end part 33*be* of the outer flange 33*b*. This facilitates mounting of the temperature sensor holder 70.

With reference to FIGS. 8 and 9, the engagement tab 73*n* of at least one of the pair of holder engagement portions 73 and 73 has the inclined surface 73*s* tapered toward the leading end in the direction perpendicular to the protruding direction thereof. Therefore, when the inclined surface 73*s* of the engagement tab 73*n* is pressed against the end of the outer flange 33*b* of the insulator 33, the curved portion 72*c* of the arm 72 is elastically deformed, the position of the engagement tab 73*n* is changed while the end of the outer flange 33*b* slides on the inclined surface 73*s* of the engagement tab 73*n*, and the engagement tab 73*n* can be engaged with the end of the outer flange 33*b* by the elastic restoring force of the curved portion 72*c* of the arm 72 after the engagement tab 73*n* climbs over the end face of the outer flange 33*b* of the insulator 33.

Therefore, the temperature sensor holder 70 can be smoothly mounted on the outer flange 33*b* of the insulator 33.

The insulator 33 has the outer flange 33*b* formed along the stator coil 34 at the opening end of the cylindrical portion 33*a* on the radially outer side of the stator 31, the cylindrical portion 33*a* being located between the stator core 32 and the stator coil 34. As illustrated in FIG. 8, the temperature sensor holder 70 is mounted on the outer flange 33*b* from the radially outer side of the stator 31 with the engagement tab 73*n* of the holder engagement portion 73 being engaged with the end of the outer flange 33*b* of the insulator 33. Therefore, the temperature sensor holder 70 does not interfere with the insertion of the rotor 41 within the stator 31, whereby the rotor 41 can be easily mounted.

In addition, it is possible to prevent the temperature sensor holder 70 from protruding from the stator coil 34 in the axial direction of the rotary drive shaft 45.

With reference to FIG. 9, the outer flange 33*b* of the insulator 33 is provided with the left positioning protrusion 33*b*L and the right positioning protrusion 33*b*R that protrude radially outward of the stator 31 and restrict the movement of the temperature sensor holder 70 in the axial direction of the rotary drive shaft 45, so that the temperature sensor holder 70 can be prevented from being disengaged from the outer flange 33*b* even when the motor 30 receives impact or vibration in the axial direction of the rotary drive shaft 45.

Referring to FIG. 9, when the opening 33*bh* through which the stator coil 34 is exposed is formed in the outer flange 33*b* of the insulator 33 and the temperature sensor holder 70 is mounted on the outer flange 33*b*, the temperature sensor 60 held by the sensor holding portion 71 enters the opening 33*bh* and is brought into pressure contact with the stator coil 34, so that a simple and compact temperature sensor mounting structure can be obtained.

Referring to FIG. 9, the curved portion 72*c* of the arm 72 of the temperature sensor holder 70 is curved so as to project outward in the radial direction of the stator 31, and the temperature sensor 60 held by the sensor holding portion 71 is brought into pressure contact with the stator coil by the elastic force of the curved portion 72*c* of the arm 72 toward the inside of the stator 31 in the radial direction (the direction indicated by the arrow Z in FIG. 9). Therefore, even when the motor 30 receives vibration of the stator 31 in the radial direction, the temperature sensor 60 can be constantly brought into pressure contact with the stator coil 34 following the vibration by the elastic deformation of the curved portion 72*c* of the arm 72 that is curved so as to project outward in the radial direction of the stator 31.

Referring to FIG. 3, the motor 30 is mounted on the motorcycle 1 with the rotary drive shaft 45 being oriented in the left-right horizontal direction. Therefore, the vibration of the motor 30 in the vertical direction accompanying the traveling of the vehicle is the vibration of the stator 31 of the motor 30 in the radial direction, and thus, the elastic deformation of the curved portion 72*c* projecting in the radial direction of the arm 72 effectively acts, so that the temperature sensor 60 can be constantly pressed against the stator coil 34 following the vibration in the vertical direction. Accordingly, the temperature of the stator coil 34 can be constantly and stably measured.

While the temperature sensor holder and the temperature sensor mounting method according to the embodiment of the present invention has been described above, the aspect of the present invention is not limited to the above-described embodiment, and the prevent invention can be embodied in various aspects within the scope of the gist of the present invention.

In the present embodiment, the temperature sensor holder 70 includes the pair of arms 72 and 72 extending in the opposite directions from the sensor holding portion 71 and the pair of holder engagement portions 73 and 73 at the outer ends of the arms 72 and 72. However, a temperature sensor holder including only one arm extending from the sensor holding portion and one holder engagement portion at the outer end of the arm may be applied. With this temperature sensor holder, the temperature sensor holder can be mounted on the motor in such a manner that the holder engagement portion is engaged with the insulator of the motor due to elastic force to close the curved portion of the arm, and at the same time, the sensor holding portion brings the temperature sensor in pressure contact with the stator coil.

REFERENCE SIGNS LIST

1 motorcycle
2 vehicle body frame
3 head pipe
4 main frame
5 down frame
6 seat rail
7 back stay

8 seat
10 front fork
11 front wheel
12 steering handlebar
15 link mechanism
16 rear cushion
17 stand
20 power unit
21 swing frame
21M main arm
21*b* bracket
22 arm cover
23 power transmission mechanism
25 rear wheel
26 rear axle
30 motor
31 stator
32 stator core
32*a* outer arc-shaped end part
33 insulator
33*a* cylindrical portion
33*b* outer flange
33*be* left end part
33*bh* opening
33*b*L left positioning protrusion
33*b*R right positioning protrusion
33*c* inner flange
34 stator coil
35 three-phase electric wire
37 bolt
41 rotor
42 cylindrical boss portion
43 rotor core
44 magnet
45 rotary drive shaft
46 nut
47 washer
50 motor cover
60 temperature sensor
61 sensor tube
62 temperature measuring unit
63 signal line
70 temperature sensor holder
71 sensor holding portion
71*a* central base part
71*n* holder tab
72 arm
72*c* curved portion
73 holder engagement portion
73*n* engagement tab
73*s* inclined surface
73*p* protruding piece
75 connection portion
76 box portion

The invention claimed is:

1. A temperature sensor mounting method for mounting a temperature sensor using a temperature sensor holder for mounting the temperature sensor that measures a temperature of a measured portion to an object having the measured portion, and including a sensor holding portion that holds the temperature sensor, a holder engagement portion that is to be engaged with the object, and an arm having a curved portion connecting the sensor holding portion and the holder engagement portion, to a motor including a stator that includes a stator coil wound around a stator core via an insulator and a rotor that holds a magnet and that is supported within the stator together with a rotary drive shaft in a rotatable manner, the stator being formed in an annular shape by arranging a plurality of the stator coils in a circumferential direction, the temperature sensor detecting a temperature of the stator coil, the temperature sensor mounting method comprising:

engaging the holder engagement portion with the insulator by an elastic force of the curved portion of the arm of the temperature sensor holder, and at the same time, bringing the temperature sensor into pressure contact with the stator coil by the sensor holding portion to mount the temperature sensor holder to the insulator, wherein the insulator has a flange formed along the stator coil at an opening end of a cylindrical portion on a radially outer side of the stator, the cylindrical portion being located between the stator core and the stator coil, and wherein the temperature sensor holder is mounted on the flange from a radially outer side of the stator with the holder engagement portion being engaged with an end of the flange.

2. The temperature sensor mounting method as claimed in claim 1, wherein the holder engagement portion includes an engagement tab that protrudes, and wherein the engagement tab is engaged with an end of the insulator.

3. The temperature sensor mounting method as claimed in claim 2, wherein the holder engagement portion includes a protruding piece formed closer to the arm relative to the engagement tab, the protruding piece protruding in a direction same as the engagement tab, and wherein the engagement tab is engaged with an end of the insulator positioned between the engagement tab and the protruding piece.

4. The temperature sensor mounting method as claimed in claim 3, wherein a pair of the arms extends from the sensor holding portion of the temperature sensor holder in directions opposite to each other, and a pair of the holder engagement portions is provided at outer ends of the pair of arms.

5. The temperature sensor mounting method as claimed in claim 3, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

6. The temperature sensor mounting method as claimed in claim 2, wherein a pair of the arms extends from the sensor holding portion of the temperature sensor holder in directions opposite to each other, and a pair of the holder engagement portions is provided at outer ends of the pair of arms.

7. The temperature sensor mounting method as claimed in claim 6, wherein the engagement tab of at least one of the pair of holder engagement portions has an inclined surface tapered toward a leading end in a direction perpendicular to a protruding direction of the engagement tab.

8. The temperature sensor mounting method as claimed in claim 7, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

9. The temperature sensor mounting method as claimed in claim 6, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

10. The temperature sensor mounting method as claimed in claim 2, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

11. The temperature sensor mounting method as claimed in claim 1, wherein the flange of the insulator is formed with a positioning protrusion that protrudes outward in a radial direction of the stator and restricts movement of the temperature sensor holder in an axial direction of the rotary drive shaft.

12. The temperature sensor mounting method as claimed in claim 11, wherein the flange of the insulator has an opening through which the stator coil is exposed, and wherein when the temperature sensor holder is mounted on the flange, the temperature sensor held by the sensor holding portion enters the opening and is brought into pressure contact with the stator coil.

13. The temperature sensor mounting method as claimed in claim 1, wherein the flange of the insulator has an opening through which the stator coil is exposed, and wherein when the temperature sensor holder is mounted on the flange, the temperature sensor held by the sensor holding portion enters the opening and is brought into pressure contact with the stator coil.

14. The temperature sensor mounting method as claimed in claim 13, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

15. The temperature sensor mounting method as claimed in claim 1, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

16. The temperature sensor mounting method as claimed in claim 15, wherein the motor is mounted on a vehicle with the rotary drive shaft being oriented in a horizontal direction.

17. The temperature sensor mounting method as claimed in claim 15, wherein the curved portion of the arm of the temperature sensor holder is curved so as to project outward in a radial direction of the stator, and wherein the temperature sensor held by the sensor holding portion is brought into pressure contact with the stator coil by an elastic force of the curved portion of the arm toward inside of the stator in a radial direction.

18. A temperature sensor holder for mounting a temperature sensor that measures a temperature of a stator coil to a motor including a stator that includes the stator coil wound around a stator core via an insulator and a rotor that holds a magnet and that is supported within the stator together with a rotary drive shaft in a rotatable manner, the temperature sensor holder comprising:

a sensor holding portion that holds the temperature sensor;

a holder engagement portion that is to be engaged with the object; and an arm having a curved portion connecting the sensor holding portion and the holder engagement portion, wherein the insulator has a flange formed along the stator coil at an opening end of a cylindrical portion on a radially outer side of the stator, the cylindrical portion being located between the stator core and the stator coil, wherein each of the pair of arms extends from the sensor holding portion respectively in circumferential directions opposite to each other, and wherein the temperature sensor holder is mounted on the flange from a radially outer side of the stator with the pair of holder engagement portion provided at circumferentially both outer ends of the pair of arms being engaged with circumferentially both ends of the flange.

19. The temperature sensor holder as claimed in claim 18, wherein the flange of the insulator is formed with a positioning protrusion that protrudes outward in a radial direction of the stator and restricts movement of the temperature sensor holder in an axial direction of the rotary drive shaft.

20. The temperature sensor holder as claimed in claim 18, wherein the flange of the insulator has an opening through which the stator coil is exposed, and wherein when the temperature sensor holder is mounted on the flange, the temperature sensor held by the sensor holding portion enters the opening and is brought into pressure contact with the stator coil.

* * * * *